UNITED STATES PATENT OFFICE.

ALEXANDER CLASSEN, OF AACHEN, GERMANY.

PROCESS OF ELECTROPLATING.

SPECIFICATION forming part of Letters Patent No. 273,467, dated March 6, 1883.

Application filed February 18, 1882. (No specimens.)

*To all whom it may concern:*

Be it known that I, Dr. ALEXANDER CLASSEN, of Aachen, Empire of Germany, have invented a new and useful improvement in the Process of Electroplating, of which the following is a specification.

The object of my invention is to enable metals to be deposited more rapidly and compactly than has heretofore been possible, and so that the plating or deposited metal will not have the appearance of a precipitate, but will more nearly resemble in its color or brilliancy rolled or forged metal; also, to enable iron to be successfully deposited, which has heretofore been very difficult.

To this end my invention is a process of obtaining compact and brilliant platings or coatings of metals, consisting in converting the solution of the coating-metal, by oxalate of potassa, into double salt of potassium, adding a surplus of oxalate of ammonium, then adding carbonate of soda and precipitating the metal by connecting the object to be plated with the zinc pole of an electric battery, immersing the same in the bath, and connecting the other pole of the battery with a sheet of platinum or carbon, which is also immersed.

In carrying out my process to obtain coatings or platings of the different metals, especially of copper, iron, cobalt, nickel, zinc, cadmium, bismuth, lead, tin, and antimony, the solutions of chlorides or sulphates (for iron and tin it is immaterial whether a protoxide salt or a peroxide salt be used) of the said metals are transformed by means of a solution of neutral potassium oxalates into soluble potassium double salts. The solution is made hot, and in it is dissolved an excess of oxalate of ammonium, and later on a small quantity of sodium carbonate is added. The article to be eletroplated or coated is connected with the zinc pole of a battery and dipped in the bath. The other pole of the battery is connected with a plate of platinum or carbon, which is also dipped in the bath. The solution is then heated and the current allowed to pass freely. Obviously the current may be derived from a dynamo-electric machine instead of a battery.

It is not possible to give exact quantities of the several ingredients used in my process which will answer under all conditions, as the proportions should be varied according to the shade of the plate desired, and according to the source of electricity employed, as when dynamo machines are employed the proportions should differ from those used when electric batteries are employed. Indeed, dynamo-electric machines of different patterns require different proportions. The proportions of the ingredients may be varied as the electroplater may find necessary to secure the best results. As an example I will state the proportions which I have found to answer the purpose in plating with nickel: Using dynamo-electric machines of Siemens and Halske, I take five hundred grams of sulphate of nickel, eight hundred grams of oxalate of ammonium, and two hundred grams of oxalate of potassium. This I dissolve in about ten liters of water.

In place of sulphate of nickel, oxalate of nickel may be used, in which case the oxalate of potassium and oxalate of ammonium are used.

What I claim as my invention, and desire to secure by Letters Patent, is—

The process of obtaining compact and brilliant coatings or platings of metals, consisting in converting the solution of the coating metal by oxalate of potassa into double salts of potassium, adding a surplus of oxalate of ammonium, then adding carbonate of soda and precipitating the metal by connecting the object to be plated with the zinc pole of a battery, immersing the same into the bath, and connecting the other pole of the battery with a sheet of platinum or carbon, which is also immersed, substantially as herein described.

In testimony whereof I have signed my name to this specification in the presence of two subscribing witnesses.

ALEXANDER CLASSEN.

Witnesses:
CARL SPRINGFALD,
H. F. NEUSS.